(12) United States Patent
Kulessa et al.

(10) Patent No.: US 8,135,955 B2
(45) Date of Patent: Mar. 13, 2012

(54) DEVICE AND METHOD FOR DETECTING A MANIPULATION OF AN INFORMATION SIGNAL

(75) Inventors: Ralph Kulessa, Hilpoltstein (DE); Jörg Pickel, Pommelsbrunn (DE); Stefan Krägeloh, Erlangen (DE); Patrick Aichroth, Erlangen (DE); Frank Siebenhaar, Nürnberg (DE); Christian Neubauer, Nürnberg (DE); Wolfgang Spinnler, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 12/958,253

(22) Filed: Dec. 1, 2010

(65) Prior Publication Data

US 2011/0099386 A1    Apr. 28, 2011

Related U.S. Application Data

(63) Continuation of application No. 11/747,179, filed on May 10, 2007, now Pat. No. 7,917,763, which is a continuation of application No. PCT/EP2005/012114, filed on Nov. 11, 2005.

(30) Foreign Application Priority Data

Nov. 11, 2004    (DE) .......................... 10 2004 054 549

(51) Int. Cl.
*H04L 9/00* (2006.01)
*H04L 9/32* (2006.01)
*G06F 7/04* (2006.01)

(52) U.S. Cl. ........ 713/176; 713/177; 713/178; 713/179; 713/180; 713/181; 726/27; 726/28; 726/29; 726/30

(58) Field of Classification Search .................... 713/176
See application file for complete search history.

(56) References Cited

U.S. PATENT DOCUMENTS

| 5,870,754 | A | 2/1999 | Dimitrova et al. |
| 5,907,619 | A | 5/1999 | Davis |
| 7,289,643 | B2 * | 10/2007 | Brunk et al. .................. 382/100 |
| 2002/0178368 | A1 | 11/2002 | Yin et al. |
| 2004/0128511 | A1 | 7/2004 | Sun |
| 2005/0066172 | A1 | 3/2005 | Vorbruggen et al. |
| 2005/0232411 | A1 | 10/2005 | Srinivasan et al. |

FOREIGN PATENT DOCUMENTS

| DE | 10134682 | 2/2003 |
| JP | 2003/298579 | 10/2003 |
| WO | WO02/39714 | 5/2002 |
| WO | WO2004/002162 | 12/2003 |

OTHER PUBLICATIONS

Schneider, M. and S. Chang; A Robust Content Based Digital Signature for Image Authentication; 1996; IEEE.
English Translation of Japanese Office Action in related application No. 2007-540594, Office Action mailed on Sep. 7, 2010, 3 pages.

* cited by examiner

*Primary Examiner* — Longbit Chai
(74) *Attorney, Agent, or Firm* — Michael A. Glenn; Glenn Patent Group

(57) ABSTRACT

The present invention relates to a device for detecting a manipulation of an information signal, having an extractor for extracting an information signal component characteristic for the information signal from the information signal, an encrypter for encrypting the information signal component to obtain an encrypted signal, and a comparator for comparing the encrypted signal to a reference signal, wherein the reference signal is an encrypted representation of a non-manipulated reference signal component of a reference information signal to detect the manipulation.

19 Claims, 1 Drawing Sheet

DEVICE AND METHOD FOR DETECTING A MANIPULATION OF AN INFORMATION SIGNAL

CROSS-REFERENCE TO RELATED APPLICATIONS

This application is a continuation of U.S. patent application Ser. No. 11/747,179, filed May 10, 2007 now U.S. Pat. No. 7,917,763, which is a continuation of International Application No. PCT/EP2005/012114, filed Nov. 11, 2005, which designated the United States and was not published in English.

TECHNICAL FIELD

The present invention relates to checking the integrity of information signals.

BACKGROUND

With an ongoing spreading of modern communication media, the importance of concepts protecting information signals from unauthorized manipulation and/or revealing a manipulation is increasing.

When the information signals are, for example, digital audio or video signals, so-called watermarks are often employed to provide the data with, for example, copy protection. The watermarks are, for example, "woven" into the information signal such that removing the watermark, for example for eliminating the copy protection, inevitably leaves digital traces which may be detected. In order to prevent reproduction of the data, even in the case of a successful removal of the watermark, it is also necessary to check the data for integrity to recognize a potential manipulation.

Well-known approaches for an integrity check of information signals are based on encrypting the entire data by a cryptographic hash process. The cryptographic hash values are often referred to as a check sum. They are calculated from an input value of unknown length and unambiguously define a certain output value, the so-called hash (such as, for example, a string of 20 bytes). Here, the characteristic feature of the hash function is to determine, for any input value, an unambiguously associated output value from which the input value cannot be derived.

The complete amount of data is at first processed by the hash algorithm, i.e. the hash of the amount of data is formed. For a subsequent integrity check, the amount of data to be tested is again processed completely by the hash algorithm. If this results in the same hash as in the reference pass, it may be assumed that no changes have been made to the dataset.

The requirements to hash functions may basically be expressed in three points:
- Every hash value must be present in an equal amount of times, i.e. the probability of hash values for different input values must not differ.
- A change of the input value should result in a changed hash value.
- The complexity of generating collisions should be very high, i.e. it should be as difficult as possible to find, for a certain input value, a second input value having the same hash value.

A hash function fulfilling all three requirements is also referred to as a cryptographic hash function. SHA-1, MD4, MD5 and RIPE-MD160 are among the most important hash functions.

The cryptographic hash function SHA-1 processes blocks of a length of 512 bits and thus generates 160-bit hash values. 532-bit variables (chain variables) as well as the so-called compression function play an important role.

At first, the input value is divided into blocks of a length of 512 bits. Subsequently, the compression function takes the five chain variables and a 512-bit block and maps this to the next 532-bit values. The function runs in four rounds, each having 20 identical operations where the individual bits are shifted according to predefined calculating operations. Finally, the content of the five chain variables is output as the hash value. The usage of hash processes for an integrity check is, for example, described in Open Mobile Alliance, OMA DRM Specification V2.0, Draft Version 2.0-Apr. 10, 2004.

It is of disadvantage in the known approaches that, as a standard, a complete dataset, i.e. the entire information signal, is tested, which entails high complexity. Additionally, changes in the dataset cannot be made at a later point, such as, for example, adding one or several watermarks, without destroying the integrity of the dataset, even if only certain dataset components are changed.

SUMMARY

According to an embodiment, a device for detecting a manipulation of an information signal, wherein the information signal includes an information signal component with side information and a further information signal component with main information, the side information being linked to the main information, may have: an extractor for extracting the information signal component with side information and characteristic for the information signal from the information signal; an encryptor for encrypting the extracted information signal component with side information to acquire an encrypted signal; and a comparator for comparing the encrypted signal to a reference signal, the reference signal being an encrypted representation of a non-manipulated reference signal component with side information of a reference information signal to detect the manipulation.

According to another embodiment, a device for detecting a manipulation of an information signal may have: an extractor for extracting an information signal component characteristic for the information signal from the information signal; a decryptor for decrypting a reference signal, the reference signal being an encrypted representation of a non-manipulated reference signal component of a reference information signal to acquire a decrypted signal; and a comparator for comparing the decrypted signal to the information signal component to detect the manipulation of the information signal.

According to another embodiment, a device for generating an information signal from an input signal, the input signal including an input signal component and a further input signal component, the further input signal component including main information, and the input signal component including side information linked to the main information, may have: an encryptor for encrypting the input signal component to acquire a reference signal; and an assembler for assembling the input signal component, the further input signal component and the reference signal to generate the information signal.

According to another embodiment, a method for detecting a manipulation of an information signal, wherein the information signal includes an information signal component with side information and a further information signal component with main information, the side information being linked to the main information, may have the steps of: extracting the information signal component with side information and characteristic for the information signal from the information signal; encrypting the extracted information signal component with side information to acquire an encrypted signal; and comparing the encrypted signal to a reference signal, the reference signal being an encrypted representation of a non-manipulated reference signal component with side information of a reference information signal to detect the manipulation.

According to another embodiment, a method for detecting a manipulation of an information signal may have the steps of: extracting an information signal component characteristic for the information signal from the information signal; decrypting a reference signal, the reference signal being an encrypted representation of a non-manipulated reference signal component of a reference information signal to acquire a decrypted signal; and comparing the decrypted signal to the information signal component to detect the manipulation.

According to another embodiment, a method for generating an information signal from an input signal, the input signal including an input signal component and a further input signal component, the further input signal component including main information, and the input signal component including side information linked to the main information, may have the steps of: encrypting the input signal component to acquire a reference signal; and assembling the input signal component, the further input signal component and the reference signal to generate the information signal.

According to another embodiment, a computer program may perform, when the computer program runs on a computer, a method for detecting a manipulation of an information signal, wherein the information signal includes an information signal component with side information and a further information signal component with main information, the side information being linked to the main information, the method having the steps of: extracting the information signal component with side information and characteristic for the information signal from the information signal; encrypting the extracted information signal component with side information to acquire an encrypted signal; and comparing the encrypted signal to a reference signal, the reference signal being an encrypted representation of a non-manipulated reference signal component with side information of a reference information signal to detect the manipulation.

According to another embodiment, a computer program may perform, when the computer program runs on a computer, a method for detecting a manipulation of an information signal, the method having the steps of: extracting an information signal component characteristic for the information signal from the information signal; decrypting a reference signal, the reference signal being an encrypted representation of a non-manipulated reference signal component of a reference information signal to acquire a decrypted signal; and comparing the decrypted signal to the information signal component to detect the manipulation.

According to another embodiment, a computer program may perform, when the computer program runs on a computer, a method for generating an information signal from an input signal, the input signal including an input signal component and a further input signal component, the further input signal component including main information, and the input signal component including side information linked to the main information, the method having the steps of: encrypting the input signal component to acquire a reference signal; and assembling the input signal component, the further input signal component and the reference signal to generate the information signal.

The invention is based on the finding that a plurality of information signals connected to different applications, such as, for example, video or audio signals, comprise information characteristic for the information signal, which may be used for protecting a dataset against manipulation, simultaneously allowing non-characteristic changes in the dataset.

When the information signal is, for example, an MP3-coded file, the file should, while checking the MP3-coded audio file for integrity, such as, for example, to be able to reveal manipulations, be recognized as being unchanged when, for example, a watermark has been added by means of bitstream watermarking. Manipulations on the file changing the characteristic of the piece or even resulting in the piece (or parts of it) having to be replaced, should be recognized unambiguously. According to the present invention, in order to allow for example watermarks to be added at a later point in time, information which is characteristic and inherent for the information signal, in this example of the MP3-coded audio file, is used as a sensor.

At first, the characteristic information of a dataset, i.e. of an information signal, must be established. This step may be defined depending on the type and application of the dataset and, in the simplest case, necessitates masking out non-characteristic parts, perhaps filtering or transforming the dataset, in order to obtain the characteristic information. In an MP3-coded piece of music, it is, for example, sufficient to extract the side information or only a part of the side information, without considering spectral data forming the main information, wherein the side information is linked to the main information and, for example, includes scaling factors for the spectral data. If a watermark is, for example, added to the spectral data, this will not change the characteristic information. The integrity of the information signal is, in the inventive meaning, not affected.

In a second step, the integrity of exclusively characteristic information is protected and/or tested by a cryptographic method, wherein the hash process already mentioned may exemplarily be used for the cryptographic method.

With the example of the MP3 datastream, the scaling factors linked to the spectral data may, for example, be utilized as characteristic information such that the hash method is, for example, only applied to the scaling factors, i.e. the hash value is only calculated on the scaling factors. If bitstream watermarking is applied, the spectral values will change, but not so the scaling factors (scaling parameters). A later check of the hash will therefore provide matching, in the case that there has been no manipulation of the dataset (of the information signal). This is, for example, sufficient to prevent another piece to be used instead.

In contrast to the conventional art, where an integrity check of the entire file is performed by a cryptographic hash method without considering characteristic information, the present invention is based on protecting a dataset against manipulating its characteristic information, simultaneously allowing non-characteristic changes in the dataset.

A cryptographic hash method, such as, for example, SHA-1, may exemplarily be used for an integrity check of a dataset. It serves to check a one-to-one matching between a reference (original) and a dataset to be compared (copy). The result of this check is either "identical" or "deviation of some kind".

As has already been mentioned, it is sometimes desired to allow specific changes in a dataset, such as, for example, by adding a watermark, and nevertheless to be able to check for the characteristic information to be present in an unchanged form, i.e. that it is essentially still the original dataset, i.e. the original non-manipulated dataset. According to the invention, the characteristic information of a dataset is checked for integrity. "Characteristic information" may be defined according to the case of application. An example of this is an MP3-coded piece of music to which, as has been described above, a watermark is to be added by means of bitstream watermarking after determining the integrity information. The spectral values of the piece will change (slightly), the scaling factors and other side information, however, remain the same and differentiate the piece from other pieces of music. The characteristic information is thus retained.

According to the invention, an MP3-coded piece of music can still be recognized as being unchanged when it has been treated by bitstream watermarking. The integrity of characteristic information of a dataset is checked, changes in the dataset not changing the characteristic information, however, are allowed.

In MP3-coded pieces of music, the integrity of characteristic information signal parts including the characteristic information is not disturbed by using bitstream watermarking. Thus, it can be achieved that the original cannot be replaced by another piece or parts of another piece, which is, for example, important for DRM applications, wherein non-characteristic information may nevertheless be changed.

By means of the possibility of being able to test characteristic information of a dataset specifically for integrity, non-characteristic information may be changed without changing the integrity. In the case of an MP3-coded file, for example, a watermark may be added by means of bitstream watermarking without changing the integrity of the file in the inventive meaning, i.e., for example, without the inventive hash method to report a deviation from the original.

BRIEF DESCRIPTION OF THE DRAWING

Embodiments of the present invention will be detailed subsequently referring to the appended drawing, in which.

DETAILED DESCRIPTION

Figure 1:
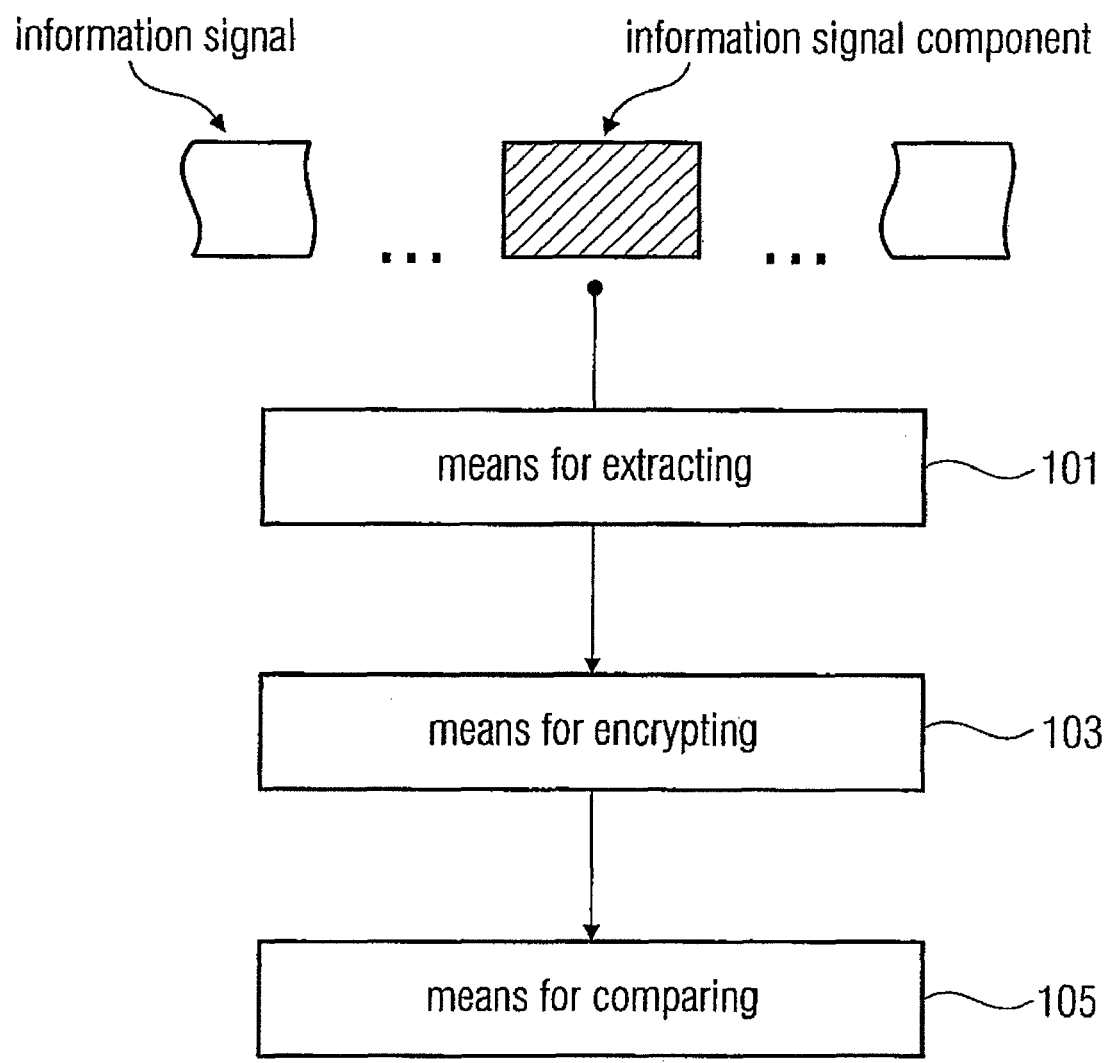
FIG. 1 is a block circuit diagram of a device for detecting a manipulation of an information signal according to an embodiment of the present invention.

The device illustrated in FIG. 1 includes means 101 for extracting, the output of which is coupled to an input of means 103 for encrypting. Means 103 for encrypting includes an output coupled to an input of means 105 for comparing.

As is illustrated in FIG. 1, the information signal includes an information signal component characteristic for the information signal. The means 101 for extracting is configured to extract the information signal component and to make available the information signal component to the means 103 for encrypting. The means 103 for encrypting is configured to encrypt the information component, for example using a cryptographic method, to obtain an encrypted signal.

The means 105 for comparing is configured to receive the encrypted signal from the means 103 for encrypting and to compare the encrypted signal to a reference signal, the reference signal being an encrypted representation of a non-manipulated reference signal component of a reference information signal to detect the manipulation of the information signal in case the information signal has been manipulated.

In the case of a detected manipulation, the means 105 for comparing may provide, via an output, a control signal indicating a manipulation of the information signal at an input of the means 101 for extracting.

Inventively, the means 101 for extracting may be configured not to filter out a further information signal component or further information signal components of the information signal such that a change of the further information components cannot be detected. If, for example, a watermark is to be added to the other components of the information signal, this change of the information signal should, according to the invention, not result in a manipulation to be detected because allowed changes of the dataset should not be detectable according to the invention, in order not to disturb the integrity check.

In order for the information signal to be processed unchanged after an integrity check when there has been no manipulation, the information signal processed by the means 101 for extracting is, for example, a copy of the information signal generated at first by the means 101 for extracting. Thus, the further information signal components may be masked out or suppressed by the means 101 for extracting such that only the information signal components having the characteristic information may pass, without destroying the information signal itself.

According to another aspect of the present invention, the means 101 for extracting is configured to detect the information signal component in the information signal and to extract a copy of the information signal component in order to obtain the information signal component.

As has already been mentioned, the information signal may include a further information signal component. The further information signal component includes, for example, main information, such as, for example, useful data. The characteristic information may, for example, be side information linked to the main information, wherein the side information is contained in the information signal component which is to be extracted by the means 101.

According to one aspect of the present invention, the information signal component and the further information signal component may be disposed in different portions of the information signal. When the information signal is, for example, present in the form of a data frame, the information signal component may, for example, be arranged at a different position of the data frame than the further information signal component. Put differently, the two components are spaced apart from each other within the information signal. In this case, the means 101 for extracting is configured to extract the portion of the information signal where the information signal component is arranged.

If, however, a spectrum of the information signal component has different spectral values than a spectrum of the further information signal component, the means 101 for extracting may be configured to filter out the spectral values of the information signal component to obtain the information signal component. The spectral values of the further information signal component may, for example, be suppressed. Here, the means 101 for extracting may include a filter or be configured as a filter itself in order to extract the spectral values linked to the information signal component. Additionally, the means 101 for extracting may be configured to form a spectral analysis in order to filter out the spectral values of the spectrum of the information signal component. For this, the means 101 for extracting for example includes a Fourier transformer configured to form a Fourier transform of the information signal, to set the spectral values of the further information signal component in the Fourier transform to zero, and to transform the result again to the time domain to obtain the information signal component.

It is to be pointed out here that filtering should be performed both when the information signal component and the further information signal component are superimposed onto each other, and also when the information signal component and the further information signal component are spaced apart from each other and are disposed in different spectral domains.

When the information signal is, for example, an audio signal, such as, for example an MPEG signal, the further information signal component, as main information, may include audio-spectral values which are, for example, coded, wherein the scaling parameters associated to the audio-spectral values are included as side information (characteristic information) from the information signal component.

The side information may, however, also be information on a number of the audio-spectral values, i.e. information regarding the distribution of the block length (block switching information), providing a distribution between short blocks and long blocks.

When the information signal is a video signal, the further information signal component may include video information as main information, wherein the information signal component exemplarily includes luminance values for the video information as further information.

The information signal component is made available to the means 103 for encrypting to obtain an encrypted signal by encrypting the information signal component using cryptographic methods. The means 103 for encrypting may, for example, be configured to form a hash value on the information signal component to obtain the encrypted signal. The means 103 for encrypting may further be configured to form a check sum on the information signal component.

According to another aspect, the means 103 for encrypting may be configured to encrypt the information signal component using, for example, the RSA algorithm using a private or public key. The means 103 for encrypting may, however, be configured to use any other well-known non-symmetrical or symmetrical encrypting method to obtain the encrypted signal.

Inventively, the encrypted signal is compared to a reference signal. The reference signal may, for example, be included by the information signal. In this case, the means 101 for extracting is further configured to extract the reference signal from the information signal. If the reference signal is disposed at a certain position of the information signal, the corresponding portion of the information signal including the reference signal will be extracted. The reference signal may, however, include a spectrum having specific reference spectral values so that the means 101 for extracting, in analogy to the discussion above, can filter out the reference spectral values to extract the reference signal.

If the reference signal is not contained in the information signal, the means for extracting may be configured to select a reference signal associated to the information signal component from a plurality of reference signals. The reference signals may, for example, be stored in a memory for any conceivable information signal component such that, using the extracted information signal component including the characteristic information, a reference signal which is, for example, bound to the characteristic information and is thus linked thereto is selected.

The reference signal may be a hash value of a check sum on a non-manipulated information signal component. In general, the information signal may be a result of a cryptographic encryption of a non-manipulated reference signal component, wherein the cryptographic method mentioned above is, for example, used here.

The non-manipulated reference signal component is, for example, identical to the original information signal component. In analogy, the reference signal may be identical to the original, i.e. non-manipulated information signal.

The above embodiments refer to the case that the information signal component is encrypted to check the data integrity. It is, however, also conceivable according to the invention that the information signal component which is characteristic for the information signal is compared to a decrypted signal to check the information signal for integrity, the decrypted signal resulting from a cryptographic decryption of a reference signal.

According to another aspect, the invention provides a device for detecting a manipulation of an information signal having means for extracting an information signal component characteristic for the information signal from the information signal, wherein the means for extracting may be identical to the means 101 for extracting already described.

Additionally, the device includes means for decrypting a reference signal, wherein the reference signal is an encrypted representation of a non-manipulated reference signal component of a reference information signal, to obtain a decrypted signal.

Additionally, the device includes means for comparing the decrypted signal to the information signal component.

The reference signal which is, for example, included by the information signal and is also extracted by the means for extracting, is, for example, an encrypted representation of the original information signal component of an original information signal.

If the information signal is, for example, a digital signature, generated using a private key, on the information signal component, the means for decrypting may be configured to decrypt the signature by a public key linked to a private key, in order to obtain the decrypted signal.

According to another aspect, the reference signal may be a signal which has been encrypted using any symmetrical or non-symmetrical encrypting method, wherein in the case of a non-symmetrical method, a private key has been used. The reference signal may then be decrypted at the reception side by a public key to obtain a decrypted version of the information signal component. After comparing the information signal component received to the decrypted version, it may be determined whether there has been a manipulation of the information signal.

According to another aspect, the present invention provides a device for generating an information signal from an input signal, the input signal including an input signal component and a further input signal component, wherein the further input signal component includes main information and the input signal component includes side information linked to the main information. The input signal component for example corresponds to the information signal component already mentioned and the further input signal component for example corresponds to the further information signal component.

The device for generating the information signal includes means for encrypting the input signal component to obtain a reference signal. Additionally, the device for generating includes means for assembling the reception signal component, the further reception signal component and the reference signal to generate the information signal.

According to one aspect of the present invention, the means for encrypting is configured to encrypt the input signal component which, for example, includes the information characteristic for the information signal or for the information signal type, using a cryptographic process, as has, for example, been mentioned above. The means for encrypting may exemplarily be configured to encrypt the input signal component using a non-symmetrical encrypting process using a private key, wherein the reference signal, as has been described above, may, for example, be decrypted using the public key.

The means for encrypting may, however, also be configured to form a hash value or a check sum on the input signal component to obtain the reference signal.

The means for assembling may exemplarily be configured to attach the reference signal to the input signal to generate the information signal. The means for assembling may, however, be configured to superimpose the reference signal for example onto the input signal, wherein the reference signal and the input signal may comprise different spectral domains. The means for assembling may, however, also be configured to dispose the reference signal at any position of the input signal.

It is possible according to the invention to check the integrity of the characteristic information of a dataset. If changes in the non-characteristic information of a dataset are performed, the integrity test will still supply the statement identical. Thus, the main information mentioned above may exemplarily be processed without changing the information signal component or input signal component. Watermarks may exemplarily be added to the further information signal component or the further input signal component without influencing the integrity of the data.

As has been described above, the characteristic information for the desired case of application is extracted in a first step, for example using a filter. In MP3-coded signals, this filter may, for example, mask out all Hoffmann code values (spectral lines, spectral values), i.e. let other bits pass. Filters of most different kinds are conceivable, including those masking out simple parts and performing complicated filter operations. Thus, only text not being formatted may, for example, be filtered out in a text document. In the case of a picture, only the luminance, and no color, is, for example, extracted, etc.

In another step, the characteristic information obtained (the output of the filter) is processed/tested by a conventional cryptographic method, such as, for example, by a cryptographic hash process.

If the information signal or input signal is an MP3-coded signal, it will be decoded until the region where scaling factors are stored as side information can be established. The hash algorithm will then be applied to the scaling factors of the dataset and the resulting hash value is stored as a reference, wherein the spectral values remain unconsidered.

Then, a watermark may be added to the signal as often as desired by means of a suitable bitstream watermarking process. For testing whether the characteristic information has changed, the region of the scaling factors (scaling parameters) is determined again (information signal component), the hash on the scaling factors is calculated and compared to the reference, as has been described above. If the characteristic information is unchanged, the hash will be the same.

Other possibilities of defining characteristic information for MP3-coded signals are, for example, the complete side information, a certain part of the spectral values, in case watermarking is only used for the complementary part, or block-switching information (distribution short blocks, long blocks) already mentioned.

The spectral values may exemplarily be scaled by scaling factors. Additionally, the spectral values may be coded, such as, for example, be Huffman-coded.

Thus, the present invention, among other things, provides a way of providing a watermark-compatible hash.

Apart from the devices described, the present invention also provides methods having the corresponding functionality. In addition, all the functionalities of the different embodiments may be combined with one another to obtain further advantageous effects of the present invention.

Depending on the circumstances, the inventive method may be implemented in either hardware or software. The implementation may be on a digital memory medium, in particular on a disc or a CD having control signals which may be read out electronically, which may cooperate with a programmable computer system such that the corresponding method will be executed. In general, the invention thus also includes a computer program product having a program code stored on a machine-readable carrier for performing at least one of the inventive methods when the computer program product runs on a computer. Put differently, the invention may also be realized as a computer program having a program code for performing the methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for detecting a manipulation of an information signal, wherein the information signal includes an information signal component with side information and a further information signal component with main information, the side information being linked to the main information, implemented in hardware and comprising:
   an extractor for extracting the information signal component with side information and characteristic for the information signal from the information signal;
   an encrypter for encrypting the extracted information signal component with side information to acquire an encrypted signal; and
   a comparator for comparing the encrypted signal to a reference signal, the reference signal being an encrypted representation of a non-manipulated reference signal component with side information of a reference information signal to detect the manipulation,
   wherein the information signal is an audio signal, wherein the further information signal component includes audio-spectral values, and wherein the information signal component includes block switching information describing a distribution of short blocks and long blocks within the audio signal.

2. The device according to claim 1, wherein the extractor is formed not to filter out the information signal component with main information such that a change of the information signal component with main information is not detectable.

3. The device according to claim 1, wherein the information signal component with side information and the information signal component with main information are arranged in different portions of the information signal, and wherein the extractor is formed to extract the portion of the information signal where the information signal component with side information is disposed to acquire the extracted information signal component.

4. The device according to claim 1, wherein a spectrum of the information signal component and a spectrum of the further information signal component comprise different spectral values, and wherein the extractor is formed to filter out the spectral values of the information signal component to acquire the information signal component.

5. The device according to claim 1, wherein the information signal is a video signal, wherein the further information signal component includes video information as main information, and wherein the information signal component includes luminance values for the video information as side information.

6. The device according to claim 1, wherein the encrypter is formed to form a hash value or a check sum on the information signal component to acquire the encrypted signal.

7. The device according to claim 1, wherein the information signal further includes the reference signal, wherein the extractor is formed to extract the reference signal from the information signal.

8. The device according to claim 7, wherein the extractor is formed to select a reference signal associated to the information signal component from a plurality of reference signals.

9. The device according to claim 7, wherein the reference signal is a hash value or a check sum on the non-manipulated reference signal component.

10. The device according to claim 1, wherein the non-manipulated reference signal component is identical to the original information signal component, and wherein the reference signal is identical to the original information signal.

11. The device according to claim 1, wherein the extractor is configured such that the encrypted signal is dependent on the block switching information, but independent from audio-spectral values and scaling parameters of the audio signal.

12. A device for detecting a manipulation of an information signal, wherein the information signal includes an information signal component with side information and a further information signal component with main information, the side information being linked to the main information, implemented on hardware and comprising:
- an extractor for extracting an information signal component characteristic for the information signal from the information signal;
- a decryptor for decrypting a reference signal, the reference signal being an encrypted representation of a non-manipulated reference signal component with side information of a reference information signal to acquire a decrypted signal for detecting the manipulation; and
- a comparator for comparing the decrypted signal to the information signal component to detect the manipulation of the information signal,
- wherein the information signal is an audio signal, wherein the further information signal component includes audio-spectral values, and wherein the information signal component includes block switching information describing a distribution of short blocks and long blocks within the audio signal.

13. The device according to claim 12, wherein the extractor is configured such that the decrypted signal is dependent on the block switching information, but independent from audio-spectral values and scaling parameters of the audio signal.

14. A device for generating an information signal from an input signal, the input signal including an input signal component and a further input signal component, the further input signal component including main information, and the input signal component including side information linked to the main information, the device implemented on hardware and including:
- an encrypter for encrypting the input signal component to acquire a reference signal; and
- an assembler for assembling the input signal component, the further input signal component and the reference signal to generate the information signal, so as to enable a comparator of a receiving/detecting device for comparing the encrypted signal to the reference signal, the reference signal being an encrypted representation of a non-manipulated reference signal component with side information of the reference information signal to detect the manipulation,
- wherein the information signal is an audio signal, wherein the further information signal component includes audio-spectral values, and wherein the information signal component includes block switching information describing a distribution of short blocks and long blocks within the audio signal.

15. The device according to claim 14, wherein the encrypter is configured such that the reference signal is dependent on the block switching information, but independent from audio-spectral values and scaling parameters of the audio signal.

16. A method for generating an information signal from an input signal, the input signal including an input signal component and a further input signal component, the further input signal component including main information, and the input signal component including side information linked to the main information, configuring at least one processor to perform the functions of:
- encrypting the input signal component to acquire a reference signal; and
- assembling the input signal component, the further input signal component and the reference signal to generate the information signal, so as to enable a comparator of a receving detecting device for comparing the encrypted input signal to the reference signal, the reference signal being an encrypted representation of a non-manipulated reference signal component with side information of the reference information signal to detect the manipulation,
- wherein the information signal is an audio signal, wherein the further information signal component includes audio-spectral values, and wherein the information signal component includes block switching information describing a distribution of short blocks and long blocks within the audio signal.

17. A method for detecting a manipulation of an information signal, wherein the information signal includes an information signal component with side information and a further information signal component with main information, the side information being linked to the main information, configuring at least one processor to perform the function of:
- extracting an information signal component characteristic for the information signal from the information signal;
- decrypting a reference signal, the reference signal being an encrypted representation of a non-manipulated reference signal component with side information of a reference information signal to acquire a decrypted signal for detecting the manipulation; and
- comparing the decrypted signal to the information signal component to detect the manipulation,
- wherein the information signal is an audio signal, and wherein the further information signal component includes audio-spectral values, and wherein the information signal component includes block switching information describing a distribution of short blocks and long blocks within the audio signal.

18. A non-transitory computer-readable storage medium having stored thereon a computer program for performing, when the computer program runs on a computer, a method for generating an information signal from an input signal, the input signal including an input signal component and a further input signal component, the further input signal component including main information, and the input signal component including side information linked to the main information, of the method comprising:

encrypting the input signal component to acquire a reference signal; and assembling the input signal component, the further input signal component and the reference signal to generate the information signal, so as to enable a comparator of a receiving detecting device for comparing the encrypted input signal to the reference signal, the reference signal being an encrypted representation of a non-manipulated reference signal component with side information of the reference information signal to detect the manipulation, wherein the information signal is an audio signal, wherein the further information signal component includes audio-spectral values, and wherein the information signal component includes block switching information describing a distribution of short blocks and long blocks within the audio signal.

19. A non-transitory computer-readable storage medium having stored thereon a computer program for performing, when the computer program runs on a computer, a method for detecting a manipulation of an information signal, wherein the information signal includes an information signal component with side information and a further information signal component with main information, the side information being linked to the main information, of the method comprising:

extracting an information signal component characteristic for the information signal from the information signal;

decrypting a reference signal, the reference signal being an encrypted representation of a non-manipulated reference signal component with side information of a reference information signal to acquire a decrypted signal for detecting the manipulation; and comparing the decrypted signal to the information signal component to detect the manipulation, wherein the information signal is an audio signal, and wherein the further information signal component includes audio-spectral values, and wherein the information signal component includes block switching information describing a distribution of short blocks and long blocks within the audio signal.

* * * * *